(12) United States Patent
Kwon

(10) Patent No.: US 10,753,385 B2
(45) Date of Patent: Aug. 25, 2020

(54) ELECTRONIC POWER STEERING SYSTEM

(71) Applicant: MANDO CORPORATION, Gyeonggi-do (KR)

(72) Inventor: Hyun Bi Kwon, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 271 days.

(21) Appl. No.: 15/717,917

(22) Filed: Sep. 27, 2017

(65) Prior Publication Data

US 2018/0100537 A1  Apr. 12, 2018

(30) Foreign Application Priority Data

Oct. 10, 2016 (KR) .................. 10-2016-0130580

(51) Int. Cl.
*F16C 1/08* (2006.01)
*B62D 6/10* (2006.01)
*G01L 5/22* (2006.01)
*B62D 7/00* (2006.01)
*B62D 5/04* (2006.01)
*F16F 1/14* (2006.01)

(52) U.S. Cl.
CPC .................. *F16C 1/08* (2013.01); *B62D 6/10* (2013.01); *B62D 7/00* (2013.01); *G01L 5/221* (2013.01); *B62D 5/04* (2013.01); *F16F 1/14* (2013.01)

(58) Field of Classification Search
CPC .... F16C 1/08; B62D 7/00; B62D 5/04; B62D 6/10; B62D 3/02; B62D 6/00; B62D 1/16; B62D 5/0463; F16F 1/14; G01L 5/221; B60W 2510/202
USPC .............................. 464/97; 267/154; 180/444
See application file for complete search history.

(56) References Cited

U.S. PATENT DOCUMENTS 4,387,737 A * 6/1983 Tobiasz .................. B62D 5/083
4,971,267 A * 11/1990 Fulton ..................... B64C 13/24
464/97

FOREIGN PATENT DOCUMENTS

| GB | 691281 | * 5/1953 | ..................... 464/97 |
| JP | 5958664 | 7/2016 | |
| KR | 10-2014-0026927 | 3/2014 | |

OTHER PUBLICATIONS

Office Action dated Jan. 2, 2018 for Korean Patent Application No. 10-2016-0130580 and its English machine translation by Google Translate.

* cited by examiner

Primary Examiner — Greg Binda
(74) Attorney, Agent, or Firm — Ladas & Parry, LLP

(57) ABSTRACT

An electronic power steering system includes: an input shaft connected to a steering shaft; an output shaft to which one end of the input shaft is connected; and a torsion bar inserted into the input shaft and the output shaft and connecting the input shaft and the output shaft, in which the torsion bar includes a first torsion bar including a first fastening portion connected to the input shaft, a second fastening portion connected to the output shaft, and a first beam portion connecting between the first fastening portion and the second fastening portion, and formed as a hollow body, and a second torsion bar including a third fastening portion coupled into the first fastening portion, a fourth fastening portion coupled into the second fastening portion, and a second beam portion connecting between the third fastening portion and the fourth fastening portion.

17 Claims, 6 Drawing Sheets

[FIG. 1]
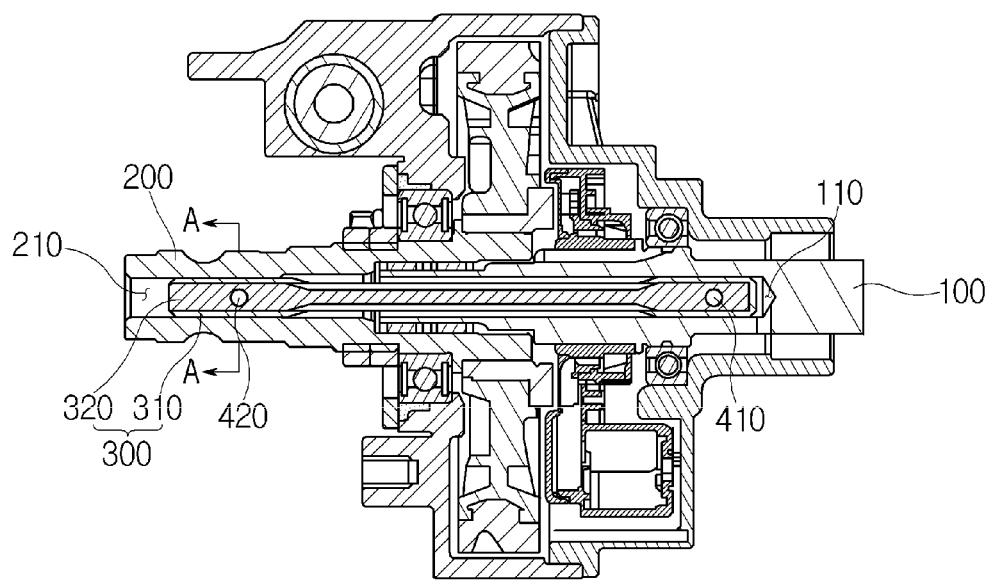
[FIG. 2]
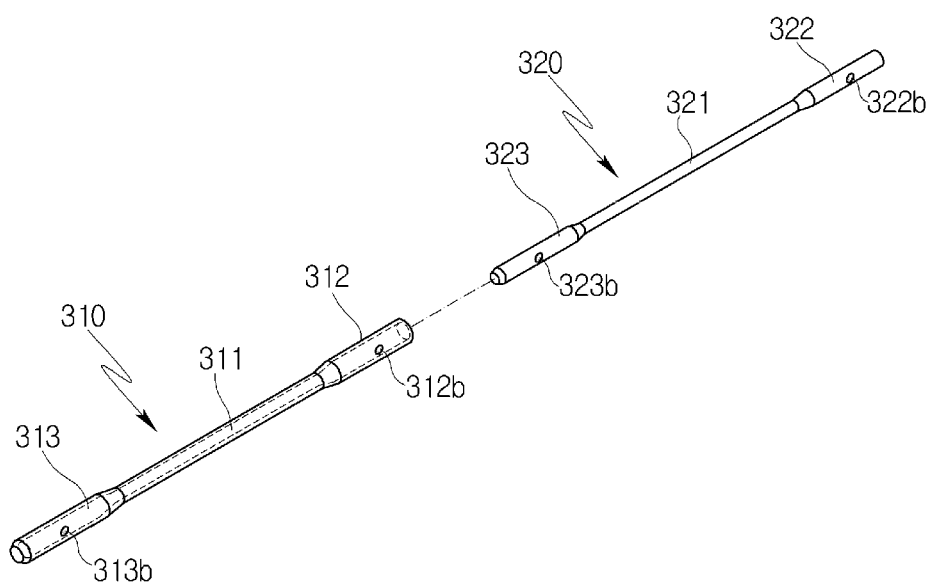

[FIG. 3]
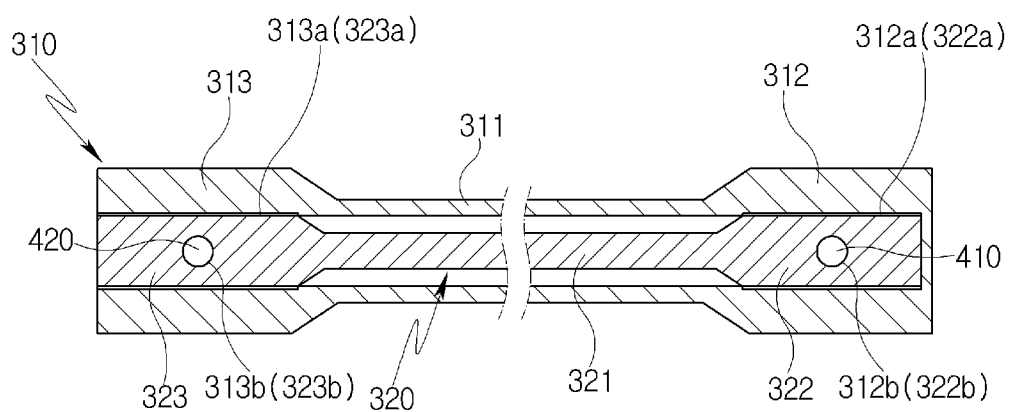
[FIG. 4]
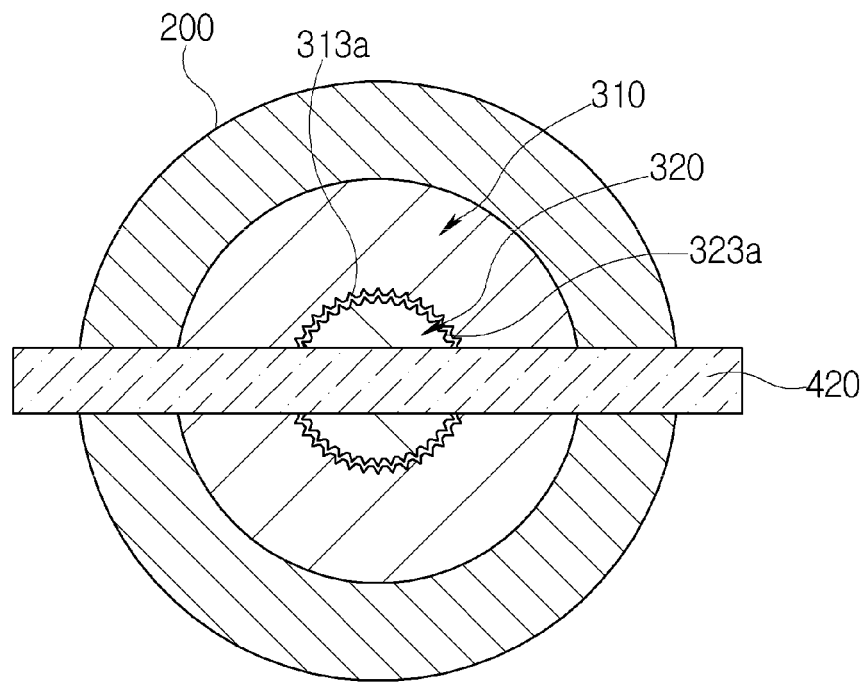

[FIG. 5]
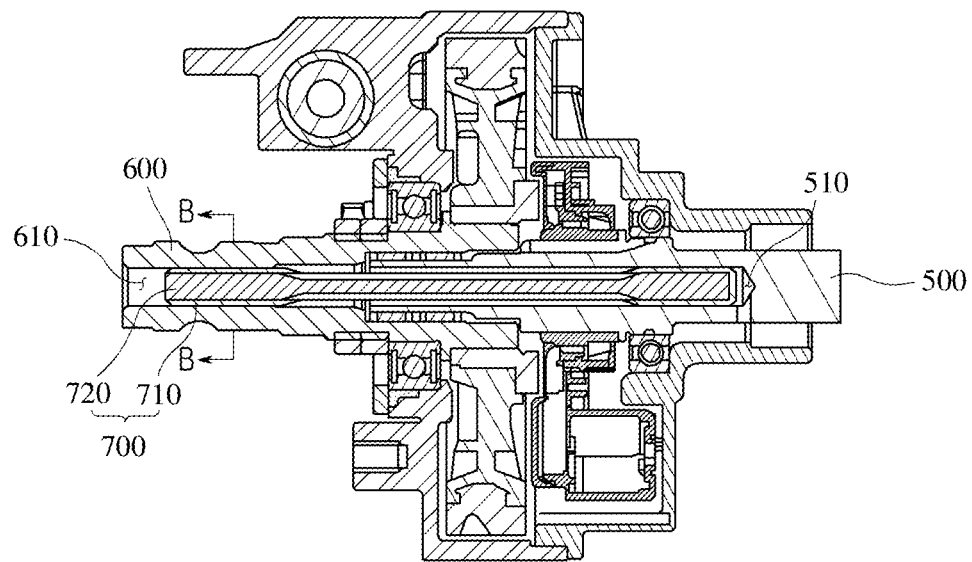
[FIG. 6]
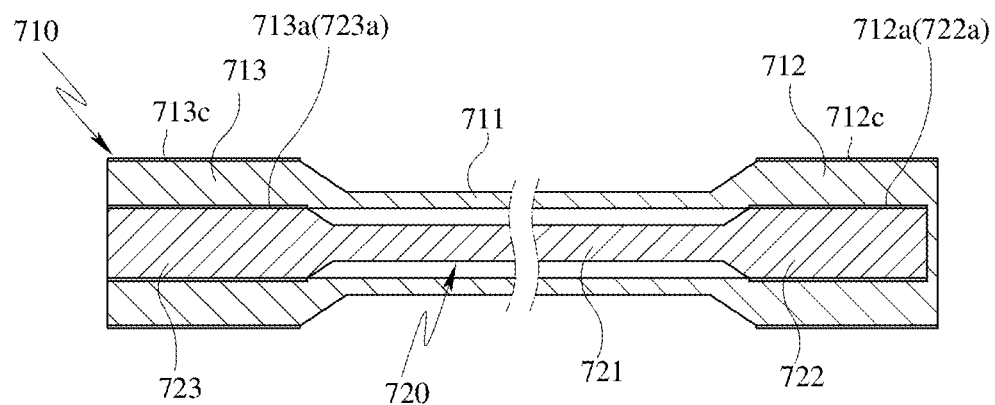

[FIG. 7]
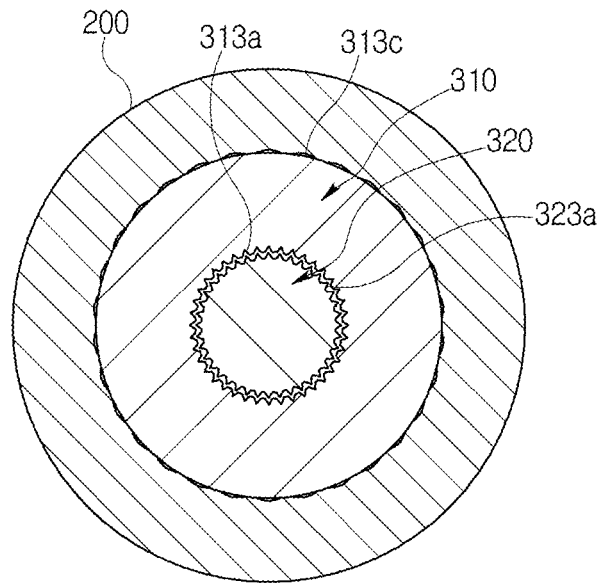
[FIG. 8]
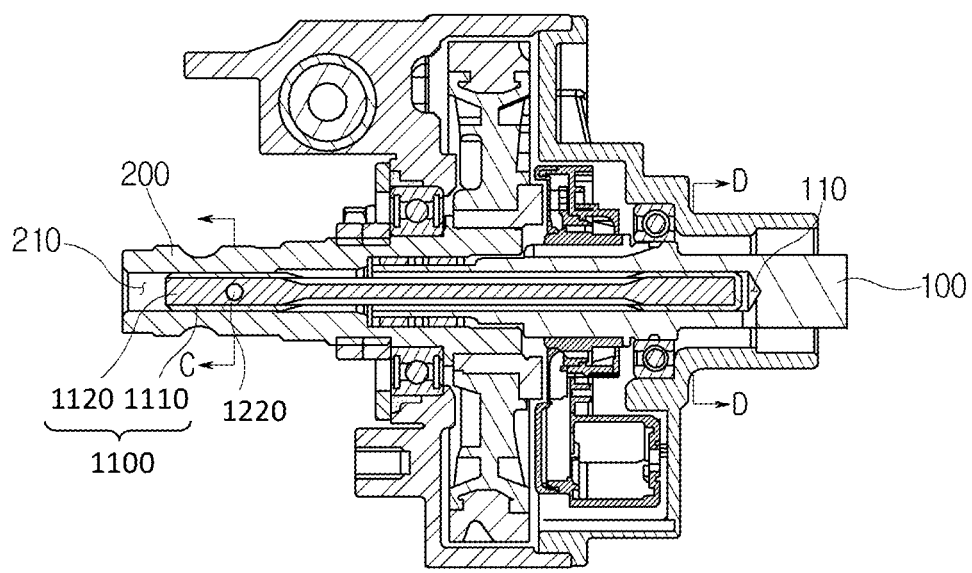

[FIG. 9]
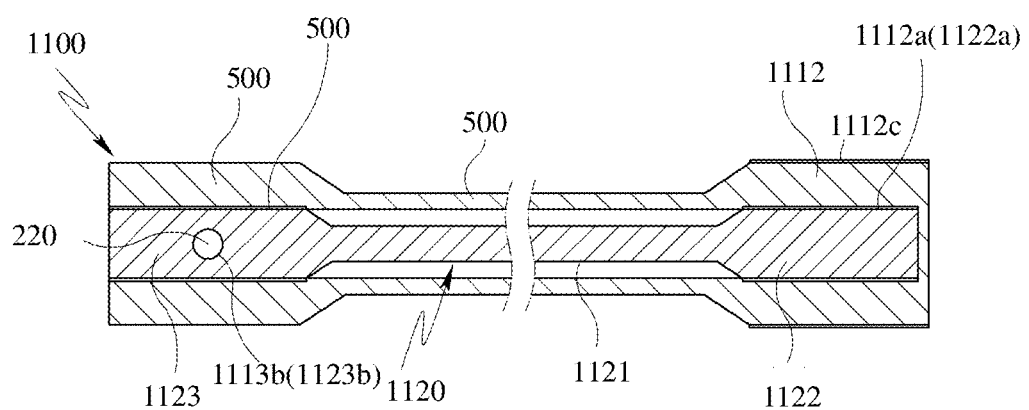
[FIG. 10]
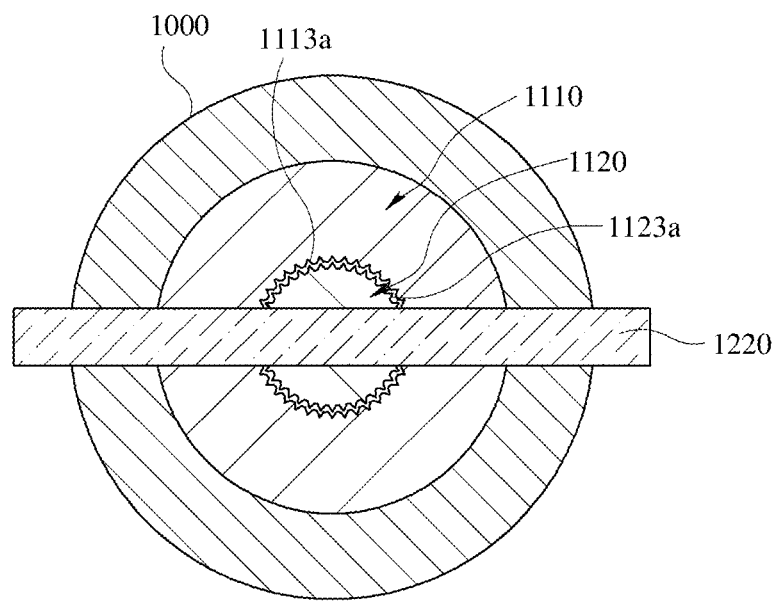

[FIG. 11]
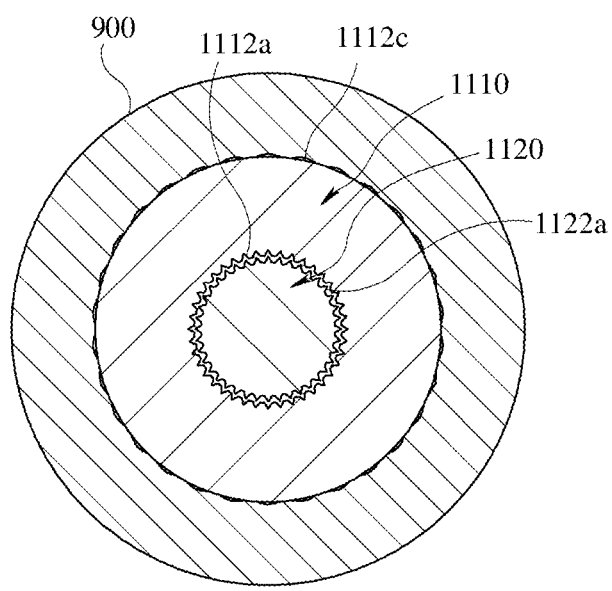

ELECTRONIC POWER STEERING SYSTEM

CROSS-REFERENCE TO RELATED APPLICATION

This application claims priority to Korean Patent Application No. 10-2016-0130580, filed on Oct. 10, 2016, the disclosure of which is incorporated herein by reference in its entirety.

BACKGROUND OF THE INVENTION

Field of the Invention

The present disclosure relate to an electronic power steering system, and more particularly, to an electronic power steering system in which two independent torsion bars are doubly disposed so that when one torsion bar is damaged, the electronic power steering system is operated by the remaining torsion bar.

Description of the Related Art

In a vehicle, a power-assisted steering system is used as a means for guaranteeing stability of a steering state by reducing steering force of a steering wheel. Conventionally, as a power-assisted steering system applied in a vehicle, a hydraulic power steering system using fluid pressure has been widely used. However, recently, an environmentally-friendly electronic power steering system (hereinafter, referred to as EPS) which facilitates steering of a driver using steering force of a motor unlike the conventional method of using fluid pressure, has been applied in a vehicle.

The EPS provides light and convenient steering feeling at the time of low speed driving by driving, an electronic control unit, a motor according to a driving condition of a vehicle sensed by a vehicle speed sensor, a steering angle sensor, a steering torque sensor, and the like, provides heavy steering feeling and good direction stability at the time of high speed driving, and rapidly providing a restoring force of a steering wheel according to a rotation angle of the steering wheel to enable rapid steering in an emergency situation, thereby providing an optimal steering condition to a driver.

That is, one end of a steering shaft is connected to an input shaft, one end of the input shaft is connected to an output shaft, and one end of the output shaft is connected to a worm wheel of a decelerator assisting the steering force by receiving a signal from the electronic control unit A torsion bar is coupled in the input shaft and the output shaft and serves as a kind of torsional spring that rotates together with the input shaft to be twisted at the time of rotation of the steering shaft. A relative amount of torsion between the input shaft and the output shaft is measured by a torque sensor and transmitted to the electronic control unit. Accordingly, the electronic control unit may generate a control signal to control generation of auxiliary steering force of the decelerator.

However, stiffness tuning of the conventional torsion bar is difficult, and an assembling process of fixing the torsion bar to the input shaft and the output shaft may be cumbersome.

RELATED ART DOCUMENT

[Patent Document]
Korean Patent Application Publication No. 10-2014-0026927

SUMMARY OF THE INVENTION

An object of the present disclosure is to provide an electronic power steering system, in which a double torsion bar structure in which the other independent torsion bar is inserted in one torsion bar is formed, and even when any of the two torsion bars is damaged, the other torsion bar that is not damaged may serve as a torsional spring.

In addition to the object of the present disclosure described above, other features and advantages of the present disclosure may be described below or may be clearly understood by a person having ordinary skill in the art to which the present disclosure pertains from the description and explanation.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an electronic power steering system includes: an input shaft connected to a steering shaft; an output shaft to which one end of the input shaft is connected; and a torsion bar inserted into the input shaft and the output shaft and connecting the input shaft and the output shaft, in which the torsion bar includes a first torsion bar including a first fastening portion connected to the input shaft, a second fastening portion connected to the output shaft, and a first beam portion connecting between the first fastening portion and the second fastening portion, and formed as a hollow body, and a second torsion bar including a third fastening portion coupled into the first fastening portion, a fourth fastening portion coupled into the second fastening portion, and a second beam portion connecting between the third fastening portion and the fourth fastening portion.

A serration may be formed on any one of an inner side surface of the first fastening portion and an outer side surface of the third fastening portion, and a serration may be formed on any one of an inner side surface of the second fastening portion and an outer side surface of the fourth fastening portion.

A first serration may be formed on an inner side surface of the first fastening portion, a second serration may be formed on an inner side surface of the second fastening portion, a third serration may be formed on an outer side surface of the third fastening portion so as to be correspondingly coupled with the first serration, and a fourth serration may be formed on an outer side surface of the fourth fastening portion so as to be correspondingly coupled with the second serration.

The first serration, the second serration, the third serration, and the fourth serration may be formed in an axial direction of the torsion bar.

Pin holes may be formed in the first fastening portion and the third fastening portion at positions corresponding to each other in a radial direction, and the first fastening portion and the third fastening portion may be fixed to the input shaft by a fixing pin.

Pin holes may be formed in the second fastening portion and the fourth fastening portion at positions corresponding to each other in a radial direction, and the second fastening portion and the fourth fastening portion may be fixed to the output shaft by a fixing pin.

A press-fitting protrusion may be formed on at least one of an outer side surface of the first fastening portion and an inner side surface of the input shaft.

A press-fitting protrusion may be formed on at least one of an outer side surface of the second fastening portion and an inner side surface of the output shaft.

A press-fitting protrusion may be formed on at least one of an outer side surface of the first fastening portion and an inner side surface of the input shaft, and the second fastening portion and the output shaft may be fixed by a fixing pin.

A press-fitting protrusion may be formed on at least one of an outer side surface of the second fastening portion and an inner side surface of the output shaft, and the first fastening portion and the input shaft may be fixed by a fixing pin.

A diameter of the first beam portion may be smaller than a diameter of the first fastening portion or the second fastening portion.

A diameter of the second beam portion may be smaller than a diameter of the third fastening portion or the fourth fastening portion.

At least one of an end of the first fastening portion and an end of the second fastening portion may be opened.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view illustrating a part of an electronic power steering system according to a first embodiment of the present disclosure;

FIG. 2 is an exploded perspective view of a torsion bar according to the first embodiment of the present disclosure;

FIG. 3 is a cross-section view of a coupled torsion bar according to the first embodiment of the present disclosure;

FIG. 4 is a cross-sectional view taken along line A-A of FIG. 1;

FIG. 5 is a cross-sectional view illustrating a part of an electronic power steering system according to a second embodiment of the present disclosure;

FIG. 6 is a cross-section view of a coupled torsion bar according to the second embodiment of the present disclosure;

FIG. 7 is a cross-sectional view taken along line B-B of FIG. 5;

FIG. 8 is a cross-sectional view illustrating a part of an electronic power steering system according to a third embodiment of the present disclosure;

FIG. 9 is a cross-section view of a coupled torsion bar according to the third embodiment of the present disclosure;

FIG. 10 is a cross-sectional view taken along line C-C of FIG. 8; and

FIG. 11 is a cross-sectional view taken along line D-D of FIG. 8.

DESCRIPTION OF SPECIFIC EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure.

In order to clearly describe the present disclosure, detailed description of portions irrelevant to essential features of the present disclosure may be omitted. Like reference numerals designate like elements throughout the specification.

In addition, unless explicitly described to the contrary, "comprising" any components will be understood to imply the inclusion of other elements rather than the exclusion of any other elements. Technical terms used herein are to described a specific embodiment, are not intended to limit the present disclosure, and unless defined otherwise in the present specification, may be construed as a concept understood by a person skilled in the art to which the present disclosure pertains.

FIG. 1 is a cross-sectional view illustrating a part of an electronic power steering system according to a first embodiment of the present disclosure.

Referring to FIG. 1, an electronic power steering system according to a first embodiment of the present disclosure may include an input shaft 100, an output shaft 200, a torsion bar 300, and a fixing pin.

One end of the input shaft 100 is connected to a steering shaft (not illustrated) and the other end of the input shaft 100 is coupled to the output shaft 200. The other end of the input shaft 100 may be inserted and coupled into one end of the output shaft 200. The input shaft 100 receives steering force from the steering shaft. That is, when a driver operates a steering wheel, the steering shaft interlocked with the steering wheel rotates, and the input shaft 100 connected to the steering shaft rotates. In an inner portion of the input shaft 100, a first space 110 is formed so that the torsion bar 300 is inserted thereinto.

One end of the output shaft 200 is connected to the input shaft 100 and the other end of the output shaft 200 is coupled to a decelerator (not illustrated). The output shaft 200 receives steering force from the input shaft 100. That is, at the time of rotation of the steering shaft, the input shaft 100 coupled with the steering shaft receives the steering force to rotate and transmits the received steering force to the output shaft 200. In an inner portion of the output shaft 200, a second space 210 is formed so that the torsion bar 300 is inserted thereinto.

The torsion bar 300 is coupled to each of the input shaft 100 and the output shaft 200 in the input shaft 100 and the output shaft 200, and serves as a kind of torsional spring that rotates together with the input shaft 100 at the time of rotation of the steering shaft to be twisted.

The torsion bar 300 may include a first torsion bar 310 and a second torsion bar 320. The first torsion bar 310 is inserted into the input shaft 100 and the output shaft 200, and the second torsion bar 320 is inserted into the first torsion bar 310. One ends of the first torsion bar 310 and the second torsion bar 320 may each be fixed to the input shaft 100 by a first fixing pin 410, and the other ends of the first torsion bar 310 and the second torsion bar 320 may each be fixed to the output shaft 200 by a second fixing pin 420.

Therefore, as the driver rotates the steering wheel, the input shaft 100 connected to the steering wheel rotates, and the output shaft 200 connected to the input shaft 100 via the first torsion bar 310 and the second torsion bar 320 rotates in an interlocking manner. At this time, a relative amount of torsion between the input shaft 100 and the output shaft 200 is measured by a torque sensor and transmitted to an electronic control unit. Accordingly, the electronic control unit generates a control signal to control generation of auxiliary steering force of the decelerator.

The torsion bar 300 of the electronic power steering system according to the embodiment of the present disclosure is doubly configured of the first torsion bar 310 and the second torsion bar 320, thereby sufficiently securing stiffness thereof. Accordingly, even when any one of the first torsion bar 310 and the second torsion bar 320 is damaged, the other torsion bar that is not damaged may still serve as a torsional spring.

FIG. 2 is an exploded perspective view of a torsion bar according to the first embodiment of the present disclosure.

Referring to FIG. 2, the torsion bar 300 according to the first embodiment of the present disclosure includes the first torsion bar 310 and the second torsion bar 320 formed to have a cylindrical shape.

The first torsion bar 310 includes a first beam portion 311, and a first fastening portion 312 and a second fastening portion 313 may be provided at both ends of the first beam portion 311. The first beam portion 311 may rotate in an interlocking manner at the time of rotation of the input shaft 100 to provide torsion stress. The first fastening portion 312 is inserted and coupled into the input shaft 100 and the second fastening portion 313 is inserted into the output shaft 200. A first pin hole 312b and a second pin hole 313b are each formed in the first fastening portion 312 and the second fastening portion 313 in a radial direction. The first torsion bar 310 is formed as a hollow body, and the second torsion bar 320 may be inserted and coupled into the first torsion bar 310. The first fastening portion 312 and the second fastening portion 313 may be formed to have the same diameter, and the diameter of the first fastening portion 312 and the second fastening portion 313 may be formed to be greater than a diameter of the first beam portion 311 to increase fastening force with the input shaft 100 and the output shaft 200.

The second torsion bar 310 is inserted and coupled into the first torsion bar 310, and may include a second beam portion 321, and a third fastening portion 322 and a fourth fastening portion 323. The second beam portion 321 may rotate in an interlocking manner together with the first beam portion 311 at the time of rotation of the input shaft 100 to provide torsion stress. The third fastening portion 322 is inserted and coupled into the first fastening portion 312 and the fourth fastening portion 323 is inserted and coupled into the second fastening portion 313. The third fastening portion 322 and the fourth fastening portion 323 are each provided with a third pin hole 322b and a fourth pin hole 323b in a radial direction to correspond to the first pin hole 312b and the second pin hole 313b. The third fastening portion 322 and the fourth fastening portion 323 may be formed to have the same diameter, and the diameter of the third fastening portion 322 and the fourth fastening portion 323 may be formed to be the same as an inner diameter of the first fastening portion 312 and the second fastening portion 313, and the diameter of the third fastening portion 322 or the fourth fastening portion 323 may be formed to be greater than a diameter of the second beam portion 321 to increase fastening force of the first torsion bar 310.

The first torsion bar 310 and the second torsion bar 320 may be fixed to the input shaft 100 and the output shaft 200 by a fixing pin. That is, the first fastening portion 312 of the first torsion bar 310 and the third fastening portion 322 of the second torsion bar 320 may be fixed to the input shaft 100 by the first fixing pin 410, and the second fastening portion 313 of the first torsion bar 310 and the fourth fastening portion 323 of the second torsion bar 320 may be fixed to the output shaft 200 by the second fixing pin 420.

Both ends of the first torsion bar 310, that is, the first fastening portion 312 and the second fastening portion 313 may be opened so that the second torsion bar 320 is inserted in the first torsion bar 310. Alternatively, one of the first fastening portion 312 and the second fastening portion 313 may be opened, and the other one may be closed.

FIG. 3 is a cross-section view of a coupled torsion bar according to the first embodiment of the present disclosure, and FIG. 4 is a cross-sectional view taken along line A-A of FIG. 1.

Referring to FIGS. 3 and 4, the second torsion bar 320 is inserted into the first torsion bar 310, and the first torsion bar 310 is inserted into the input shaft 100 and the output shaft 200.

A first serration 312a may be formed on an inner side surface of the first fastening portion 312 of the first torsion bar 310, and a second serration 313a may be formed on an inner side surface of the second fastening portion 313. The first serration 312a and the second serration 313a may be formed in an axial direction of the first torsion bar 310. The first serration 312a and the second serration 313a may be formed in plural along the inner side surfaces of the first fastening portion 312 and the second fastening portion 313, respectively.

A third serration 322a may be formed on an outer side surface of the third fastening portion 322 of the second torsion bar 320 so as to correspondingly coupled with the first serration 312a, and a fourth serration 323a may be formed on an outer side surface of the fourth fastening portion 323 so as to correspondingly coupled with the second serration 313a. The third serration 322a and the fourth serration 323a may be formed in an axial direction of the second torsion bar 320. The third serration 322a and the fourth serration 323a may be formed in plural along the outer side surfaces of the third fastening portion 322 and the fourth fastening portion 323, respectively.

Pin holes are formed in the input shaft 100, and the first pin hole 312b and the third pin hole 322b may be formed in the first fastening portion 312 of the first torsion bar 310 and the third fastening portion 322 of the second torsion bar 320, respectively, so as to correspond to the pin holes of the input shaft 100. Accordingly, the input shaft 100, the first fastening portion 312 of the first torsion bar 310, and the third fastening portion 322 of the second torsion bar 320 may be fixed to each other using the first fixing pin 410.

Pin holes are formed in the output shaft 200, and the second pin hole 313b and the fourth pin hole 323b may be formed in the second fastening portion 313 of the first torsion bar 310 and the fourth fastening portion 323 of the second torsion bar 320, respectively, so as to correspond to the pin holes of the output shaft 200. Accordingly, the output shaft 200, the second fastening portion 313 of the first torsion bar 313, and the fourth fastening portion 323 of the second torsion bar 320 may be fixed to each other using the second fixing pin 420.

Meanwhile, in the description described above, all of the inner side surfaces of the first fastening portion 312 and the second fastening portion 313 of the first torsion bar 310, and the outer side surfaces of the third fastening portion 322 and the fourth fastening portion 323 of the second torsion bar 320 are formed with the serrations, and the first torsion bar 310 and the second torsion bar 320 are configured to engage with each other, but the embodiment of the present disclosure may also be implemented in other forms. For example, any one of the inner side surface of the first fastening portion 312 of the first torsion bar 310 and the outer side surface of the third fastening portion 322 of the second torsion bar 320 is formed with the serration, and any one of the inner side surface of the second fastening portion 313 of the first torsion bar 310 and the outer side surface of the fourth fastening portion 323 of the second torsion bar 320 is formed with the serration, such that the second torsion bar 320 is press-fitted into the first torsion bar 310.

FIG. 5 is a cross-sectional view illustrating a part of an electronic power steering system according to a second embodiment of the present disclosure, FIG. 6 is a cross-section view of a coupled torsion bar according to the second embodiment of the present disclosure, and FIG. 7 is a cross-sectional view taken along line B-B of FIG. 5.

Referring to FIGS. 5 to 7, an electronic power steering system according to a second embodiment of the present disclosure may include an input shaft 500, an output shaft 600, and a torsion bar 700.

The input shaft 500 is connected to a steering shaft (not illustrated), and receives steering force from the steering shaft. That is, when a driver operates a steering wheel, the steering shaft interlocked with the steering wheel rotates, and the input shaft 500 connected to the steering shaft rotates.

The output shaft 600 is coupled with the input shaft 500 to receive steering force from the input shaft 500. That is, at the time of rotation of the steering shaft, the input shaft 500 coupled with the steering shaft receives the steering force to rotate and transmits the received steering force to the output shaft 600.

The torsion bar 700 is coupled to each of the input shaft 500 and the output shaft 600 in the input shaft 500 and the output shaft 600, and serves as a kind of torsional spring that rotates together with the input shaft 500 at the time of rotation of the steering shaft to be twisted.

The torsion bar 700 includes a first torsion bar 710 and a second torsion bar 720. The first torsion bar 710 is inserted into the input shaft 500 and the output shaft 600, and the second torsion bar 720 is inserted into the first torsion bar 710.

A first serration 712a may be formed on an inner side surface of the first fastening portion 712 of the first torsion bar 710, and a second serration 713a may be formed on an inner side surface of the second fastening portion 713. The first serration 712a and the second serration 713a may be formed in an axial direction of the first torsion bar 710. The first serration 712a and the second serration 713a may be formed in plural along outer side surfaces of the first fastening portion 712 and the second fastening portion 713, respectively.

A third serration 722a may be formed on an outer side surface of the third fastening portion 722 of the second torsion bar 720 so as to correspondingly coupled with the first serration 712a, and a fourth serration 732a may be formed on an outer side surface of the fourth fastening portion 723 so as to correspondingly coupled with the second serration 713a. The third serration 722a and the fourth serration 723a may be formed in an axial direction of the second torsion bar 720. The third serration 722a and the fourth serration 723a may be formed in plural along the outer side surfaces of the third fastening portion 722 and the fourth fastening portion 723, respectively.

In the second embodiment of the present disclosure, a first press-fitting protrusion 712c may be formed on at least one of an inner side surface of the input shaft 400 and an outer side surface of the first fastening portion 712 of the first torsion bar 710. Further, a second press-fitting protrusion 713c may be formed on at least one of an inner side surface of the output shaft 600 and an outer side surface of the second fastening portion 713 of the first torsion bar 710. In the second embodiment of the present disclosure, a case in which the first press-fitting protrusion 712c and the second press-fitting protrusion 713c are formed on the outer side surfaces of the first fastening portion 712 and the second fastening portion 713, respectively, is described and illustrated. However, the first press-fitting protrusion 712c and the second press-fitting protrusion 713c may also be formed on the inner side surfaces of the input shaft 500 and the output shaft 600.

Accordingly, in the first embodiment of the present disclosure, the torsion bar 300 is fixed to the input shaft 100 and the output shaft 200 using the fixing pin, but in the second embodiment of the present disclosure, the torsion bar 700 may be fixed to the input shaft 500 and the output shaft 600 in a press-fitting manner without a separate fixing member like the fixing pin.

FIG. 8 is a cross-sectional view illustrating a part of an electronic power steering system according to a third embodiment of the present disclosure, FIG. 9 is a cross-section view of a coupled torsion bar according to the third embodiment of the present disclosure, FIG. 10 is a cross-sectional view taken along line C-C of FIG. 8, and FIG. 11 is a cross-sectional view taken along line D-D of FIG. 8.

Referring to FIGS. 8 to 11, an electronic power steering system according to a third embodiment of the present disclosure may include an input shaft 900, an output shaft 1000, and a torsion bar 1100.

The input shaft 900 is connected to a steering shaft (not illustrated), and receives steering force from the steering shaft. That is, when a driver operates a steering wheel, the steering shaft interlocked with the steering wheel rotates, and the input shaft 900 connected to the steering shaft rotates.

The output shaft 1000 is coupled with the input shaft 900 to receive steering force from the input shaft 900. That is, at the time of rotation of the steering shaft, the input shaft 900 coupled with the steering shaft receives the steering force to rotate and transmits the received steering force to the output shaft 1000.

The torsion bar 1100 is coupled to each of the input shaft 900 and the output shaft 1000 in the input shaft 900 and the output shaft 1000, and serves as a kind of torsional spring that rotates together with the input shaft 900 at the time of rotation of the steering shaft to be twisted.

The torsion bar 1100 may include a first torsion bar 1110 and a second torsion bar 1120. The first torsion bar 1110 is inserted into the input shaft 900 and the output shaft 1000, and the second torsion bar 1120 is inserted into the first torsion bar 1110.

A first serration 1112a may be formed on an inner side surface of the first fastening portion 1112 of the first torsion bar 1110, and a second serration 1113a may be formed on an inner side surface of the second fastening portion 1113. The first serration 1112a and the second serration 1113a may be formed in an axial direction of the first torsion bar 1110. The first serration 1112a and the second serration 1113a may be formed in plural along outer side surfaces of the first fastening portion 1112 and the second fastening portion 1113, respectively.

A third serration 1122a may be formed on an outer side surface of the third fastening portion 1122 of the second torsion bar 1120 so as to correspondingly coupled with the first serration 1112a, and a fourth serration 1123a may be formed on an outer side surface of the fourth fastening portion 1123 so as to correspondingly coupled with the second serration 1113a. The third serration 1122a and the fourth serration 1123a may be formed in an axial direction of the second torsion bar 1120. The third serration 1122a and the fourth serration 1123a may be formed in plural along the outer side surfaces of the third fastening portion 1122 and the fourth fastening portion 1123, respectively.

In the third embodiment of the present disclosure, one ends of the torsion bar 1110 and the second torsion bar 1123 may be fixed to the input shaft 900 or the output shaft 1000 using a fixing pin, and the other ends of the first torsion bar 1110 may be fixed to the input shaft 900 or the output shaft 1000 by a press-fitting protrusion 1112c formed on an outer side surface of the first torsion bar 1110.

For example, a press-fitting protrusion may be formed on at least one of an inner side surface of the input shaft 900 and an outer side surface of the first fastening portion 1112 of the first torsion bar 1110, and the first fastening portion 1112 of the first torsion bar 1110 may be press-fitted into the input shaft 900. Further, pin holes are formed in the output shaft 1000, and a second pin hole 1113b and a fourth pin hole 1123b may be formed in the second fastening portion 1113 of the first torsion bar 1110 and the fourth fastening portion 1123 of the second torsion bar 1120, respectively, so as to correspond to pin holes of the output shaft 1000. Accordingly, the output shaft 1000, the second fastening portion 1113 of the first torsion bar 1113, and the fourth fastening portion 1123 of the second torsion bar 1120 may be fixed to each other using the second fixing pin 1220.

According to the embodiments of the present disclosure, in the double torsion bar of the electronic power steering system, even when any one of two torsion bars is damaged, the other torsion bar that is not damaged may serve as a torsional spring.

Further, since the torsion bars are doubly disposed, even though stiffness of the torsion bar itself is not tuned, a capability to sufficiently withstand torsion is improved.

Effects of the present disclosure are not limited to the above-mentioned effects. Other effects that are not mentioned may be obviously understood by those skilled in the art to which the present disclosure pertains from the following description.

Those skilled in the art will appreciate that since various modifications and alterations may be made without departing from the spirit or essential feature of the present disclosure, the above-mentioned embodiments are not restrictive but are exemplary in all aspects.

It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. An electronic power steering system, comprising:
an input shaft connected to a steering shaft coupled to a steering wheel;
an output shaft to which one end of the input shaft is connected; and
a torsion bar inserted into the input shaft and the output shaft and connecting the input shaft and the output shaft,
wherein the torsion bar includes
a first torsion bar including a first fastening portion connected to the input shaft, a second fastening portion connected to the output shaft, and a first beam portion connecting between the first fastening portion and the second fastening portion, and formed as a hollow body, and
a second torsion bar including a third fastening portion coupled into the first fastening portion of the first torsion bar, a fourth fastening portion coupled into the second fastening portion of the first torsion bar, and a second beam portion connecting between the third fastening portion and the fourth fastening portion, and
wherein first pin holes are formed in the first fastening portion and the third fastening portion at positions corresponding to each other in a radial direction, and the first fastening portion and the third fastening portion are fixed to the input shaft by a first fixing pin.

2. The electronic power steering system of claim 1, wherein a serration is formed on any one of an inner side surface of the first fastening portion and an outer side surface of the third fastening portion, and a serration is formed on any one of an inner side surface of the second fastening portion and an outer side surface of the fourth fastening portion.

3. The electronic power steering system of claim 1, wherein a first serration is formed on an inner side surface of the first fastening portion, a second serration is formed on an inner side surface of the second fastening portion, a third serration is formed on an outer side surface of the third fastening portion so as to be correspondingly coupled with the first serration, and a fourth serration is formed on an outer side surface of the fourth fastening portion so as to be correspondingly coupled with the second serration.

4. The electronic power steering system of claim 3, wherein the first serration, the second serration, the third serration, and the fourth serration are formed in an axial direction of the torsion bar.

5. The electronic power steering system of claim 1, wherein second pin holes are formed in the second fastening portion and the fourth fastening portion at positions corresponding to each other in a radial direction, and the second fastening portion and the fourth fastening portion are fixed to the output shaft by a second fixing pin.

6. The electronic power steering system of claim 1, wherein a press-fitting protrusion is formed on at least one of an outer side surface of the second fastening portion and an inner side surface of the output shaft.

7. The electronic power steering system of claim 1, wherein a diameter of the first beam portion is smaller than a diameter of the first fastening portion or the second fastening portion.

8. The electronic power steering system of claim 1, wherein a diameter of the second beam portion is smaller than a diameter of the third fastening portion or the fourth fastening portion.

9. The electronic power steering system of claim 1, wherein at least one of an end of the first fastening portion and an end of the second fastening portion is opened.

10. An electronic power steering system, comprising:
an input shaft connected to a steering shaft coupled to a steering wheel;
an output shaft to which one end of the input shaft is connected; and
a torsion bar inserted into the input shaft and the output shaft and connecting the input shaft and the output shaft,
wherein the torsion bar includes
a first torsion bar including a first fastening portion connected to the input shaft, a second fastening portion connected to the output shaft, and a first beam portion connecting between the first fastening portion and the second fastening portion, and formed as a hollow body, and a second torsion bar including a third fastening portion coupled into the first fastening portion of the first torsion bar, a fourth fastening portion coupled into the second fastening portion of the first torsion bar, and a second beam portion connecting between the third fastening portion and the fourth fastening portion, and wherein a first press-fitting protrusion is formed on at least one of an outer side surface of the first fastening portion and an inner side surface of the input shaft, and the second fastening portion and the output shaft are fixed by a first fixing pin.

11. The electronic power steering system of claim 10, wherein a second press-fitting protrusion is formed on at least one of an outer side surface of the second fastening portion and an inner side surface of the output shaft, and the first fastening portion and the input shaft are fixed by a second fixing pin.

12. The electronic power steering system of claim 10, wherein a serration is formed on any one of an inner side surface of the first fastening portion and an outer side surface of the third fastening portion, and a serration is formed on any one of an inner side surface of the second fastening portion and an outer side surface of the fourth fastening portion.

13. The electronic power steering system of claim 10, wherein a first serration is formed on an inner side surface of the first fastening portion, a second serration is formed on an inner side surface of the second fastening portion, a third serration is formed on an outer side surface of the third fastening portion so as to be correspondingly coupled with the first serration, and a fourth serration is formed on an outer side surface of the fourth fastening portion so as to be correspondingly coupled with the second serration.

14. The electronic power steering system of claim 13, wherein the first serration, the second serration, the third serration, and the fourth serration are formed in an axial direction of the torsion bar.

15. The electronic power steering system of claim 10, wherein a diameter of the first beam portion is smaller than a diameter of the first fastening portion or the second fastening portion.

16. The electronic power steering system of claim 10, wherein a diameter of the second beam portion is smaller than a diameter of the third fastening portion or the fourth fastening portion.

17. The electronic power steering system of claim 10, wherein at least one of an end of the first fastening portion and an end of the second fastening portion is opened.

* * * * *